Sept. 26, 1967   A. HASBROUCK ETAL   3,343,989
ELECTRIC INSULATING AND SEALING MECHANISM FOR TUBE
PASSING THROUGH THE WALL OF A CONTAINER
FOR CORROSIVE MATERIAL
Filed April 10, 1963   5 Sheets-Sheet 1
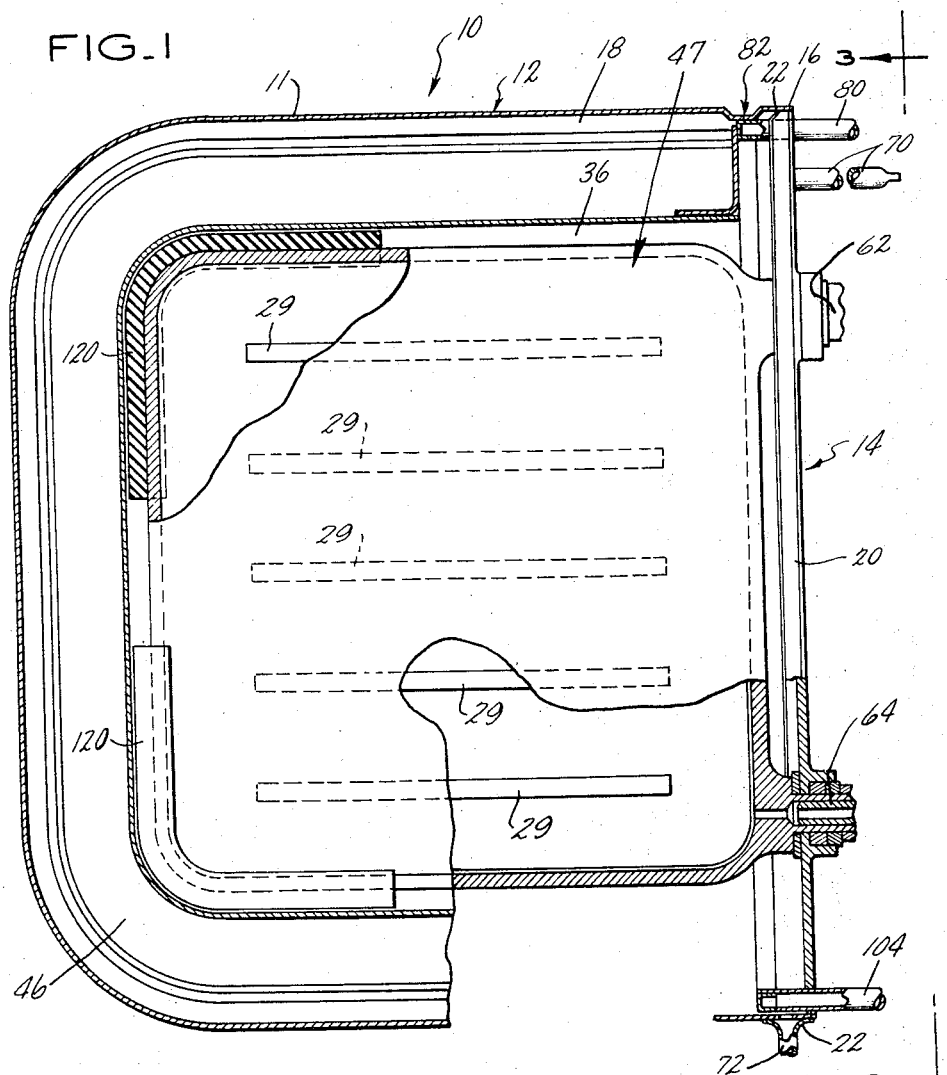
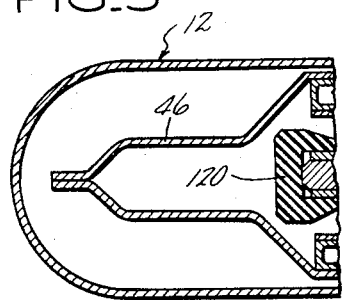
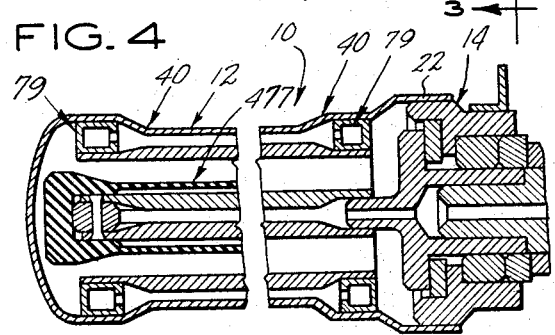
INVENTORS
AUGUSTUS HASBROUCK
STANLEY L. LEAVITT
BY Vernon F. Hauschild
ATTORNEY Sept. 26, 1967     A. HASBROUCK ETAL     3,343,989
ELECTRIC INSULATING AND SEALING MECHANISM FOR TUBE
PASSING THROUGH THE WALL OF A CONTAINER
FOR CORROSIVE MATERIAL
Filed April 10, 1963     5 Sheets-Sheet 2
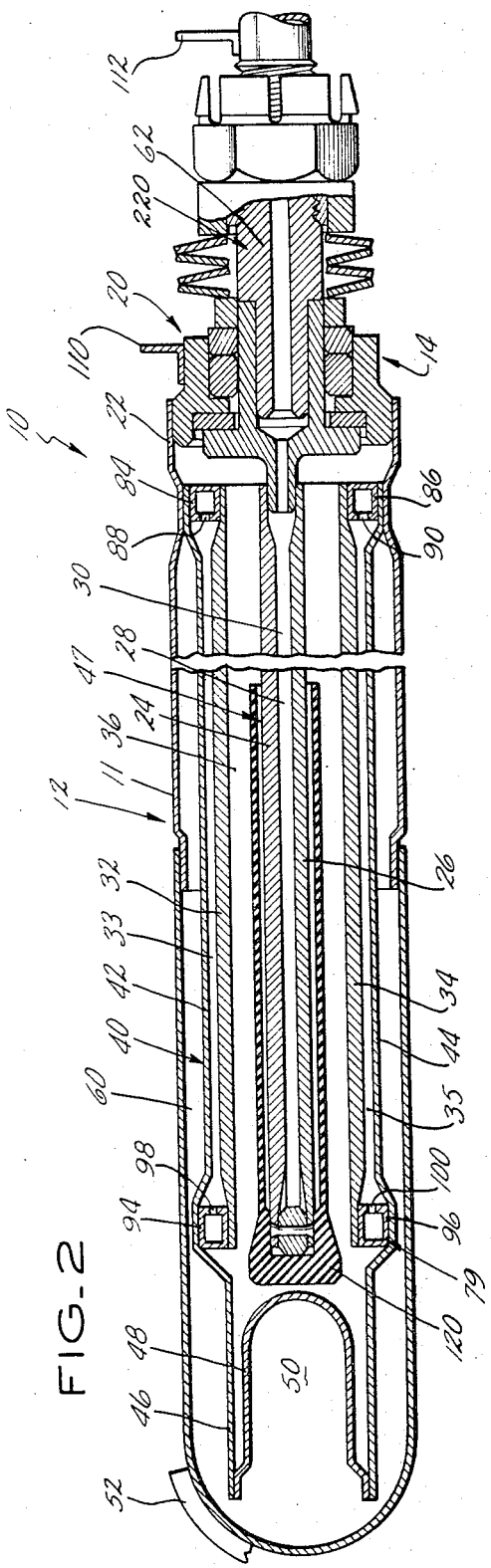
FIG_2
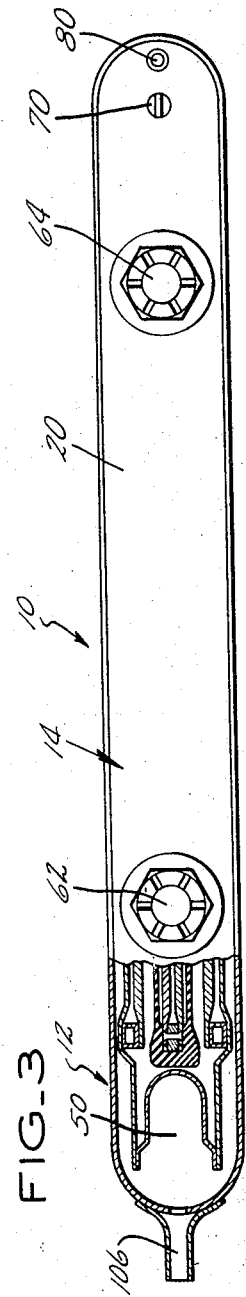
FIG_3
INVENTORS
AUGUSTUS HASBROUCK
STANLEY L. LEAVITT
BY Vernon F. Hauschild
ATTORNEY

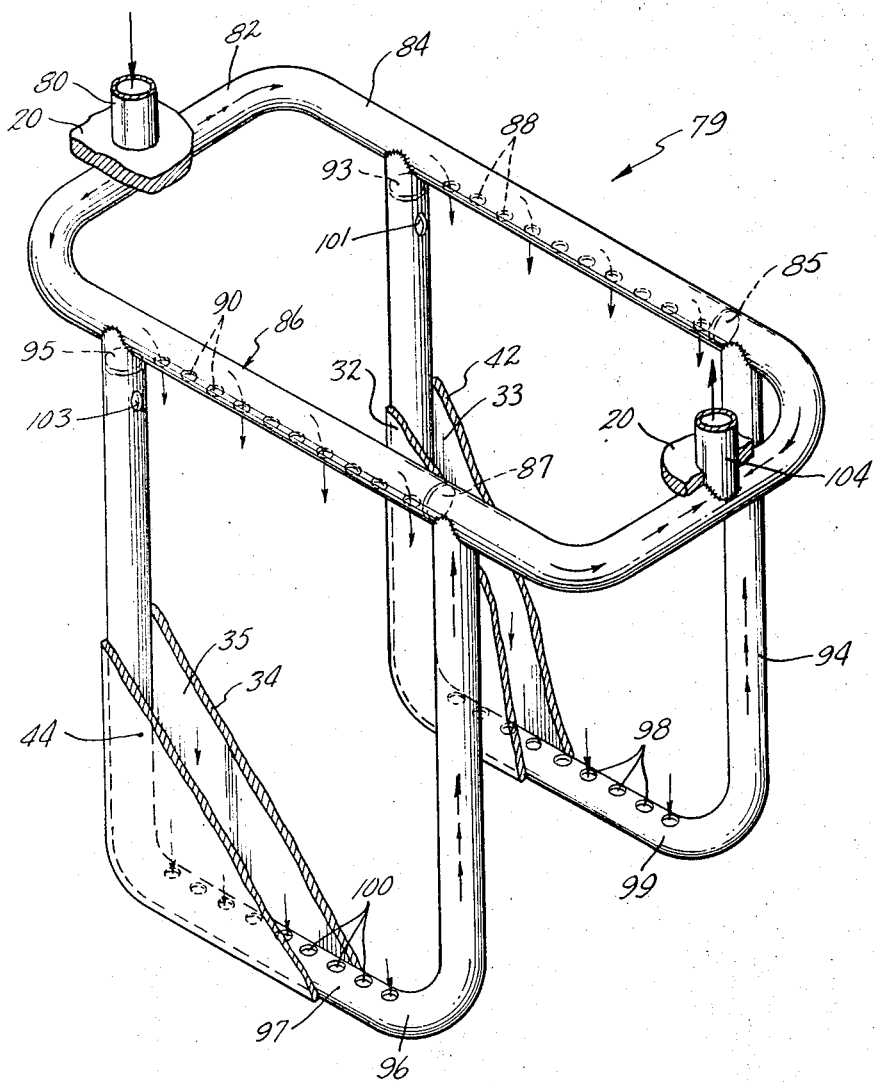

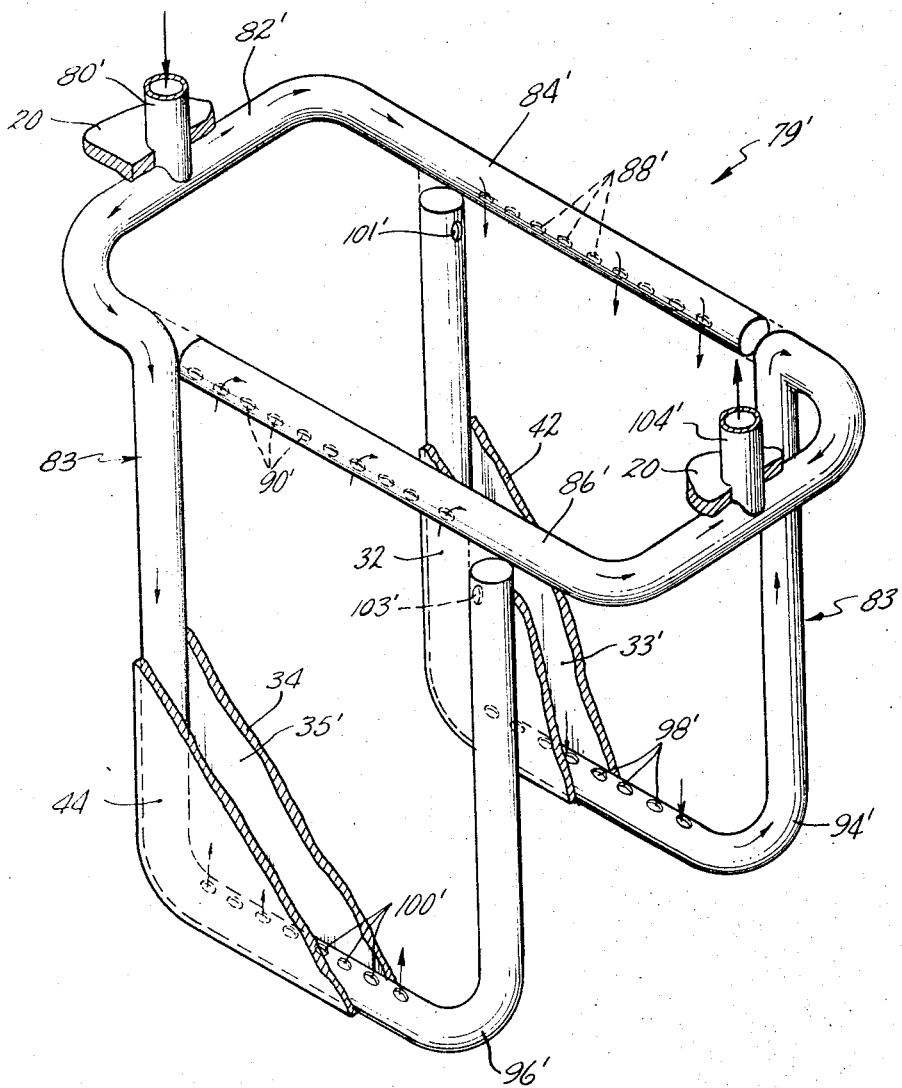

United States Patent Office 3,343,989
Patented Sept. 26, 1967

3,343,989
ELECTRIC INSULATING AND SEALING MECHA-
NISM FOR TUBE PASSING THROUGH THE
WALL OF A CONTAINER FOR CORROSIVE MA-
TERIAL
Augustus Hasbrouck, Middletown, and Stanley L. Leavitt,
Canton, Conn., assignors to United Aircraft Corpora-
tion, East Hartford, Conn., a corporation of Delaware
Filed Apr. 10, 1963, Ser. No. 272,144
1 Claim. (Cl. 136—86)

This invention relates to insulating and sealing means and in particular to providing a combination electrical insulator and fluid seal which is capable of withstanding the effects of corrosive fluids such as molten corrosive salts, and at the same time establishing the required electrical insulation between the sealed elements.

Considerable difficulty has been encountered in many fields including the fuel cell field in which a gas or fluid must be passed through the wall of a container which has corrosive fluid, such as corrosive salts in the interior thereof. When such a requirement exists in apparatus which generates electricity, such as a fuel cell, it is necessary that in addition to providing the necessary seal, the mechanism must also serve to electrically insulate the sealed elements.

It has been found that a few plastic materials, of which Teflon is one, can come into contact with these corrosive salts, such as potassium hydroxide (KOH), and suffer little if any corrosive effect therefrom.

It is an object of this invention to teach a combination seal and insulator for use with a container for corrosive fluid in which the seal material, possibly Teflon, has minimum exposure to the corrosive fluid and is in a pliable state so that any seal material loss due to corrosion will be compensated for.

It is a further object of this invention to teach a seal and insulator for a corrosive fluid container having a passage through the wall thereof and with a tube extending through said passage to accommodate the flow of a second fluid therethrough, including spaced insulating rings encircling the tube member and extending between the tube member and the container passage wall and defining an annular passage therebetween with the container and the tube member, into which a plastic seal ring is placed to completely fill the annular space between insulator rings.

It is a further object of this invention to provide shoulders on said tube member and on said container passage wall such that one of said insulator rings is snugly received between said shoulders to prevent plastic seal passage therebetween.

It is still a further object of this invention to teach a seal and insulator construction as described above wherein provisions are made for causing the aforementioned shoulders to be forceably urged toward one another and against the opposite walls of the insulator ring.

It is a further object of this invention to provide such a seal and insulator wherein the shoulder motion urging the mechanism is adjustable.

It is still a further object of this invention to teach such a seal and insulator mechanism wherein the insulator rings serve to concentrically position the tube member within the container wall passage so that the plastic seal is concentrically located about the tube member and within the passage.

It is still a further object of this invention to teach such a seal and insulator mechanism wherein a single force generating mechanism is used to axially load the locating insulating member while at the same time hydraulically loading the plastic seal member.

It is still a further object of this invention to teach such a seal and insulator construction wherein provisions are made to cause the second of said insulator rings to be urged toward the first insulator ring, which is the ring positioned between the aforementioned shoulders, and hence toward the plastic seal.

Other objects and advantages will be apparent from the specification and claim and from the accompanying drawings which illustrate an embodiment of the invention.

FIG. 1 is a side view of our scabbard-type fuel cell, partially broken away to illustrate interior construction.

FIG. 2 is a cross sectional view of our scabbard-type fuel cell.

FIG. 3 is a top view of our scabbard-type fuel cell taken along line 3—3 of FIGURE 1 and showing the cover member, partially broken away, to show its relation to the electrodes and electrolyte and reactant chambers.

FIG. 4 is a partial showing of a scabbard-type fuel cell without the outer sheath.

FIG. 5 is a showing of the reactant supply system used in our scabbard-type fuel cell with certain associated parts broken away and with other parts totally removed so as not to obscure the important parts of the reactant conveying system.

FIG. 6 is a showing similar to FIG. 5 but is a modification thereof to permit the use of similar parts.

FIG. 7 is a partial showing of an alternate-type of diaphragm to be used in our scabbard-type fuel cell.

Figure 8:
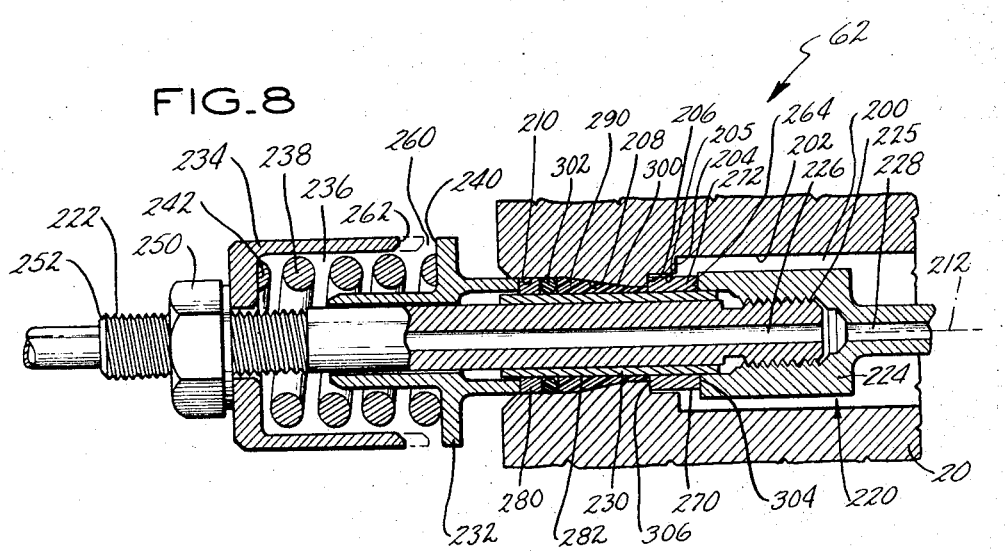
FIG. 8 is an enlarged showing of the corrosive resistant and electrical insulating seal used to position reactant conveying tubing as it passes through the cover or other wall mechanism of the hermetically sealed fuel cell container or other corrosive salt container.

By definition, a fuel cell is an electrochemical device which converts the chemical energy of two reactants directly into electrical energy. In contrast to a voltaic cell, the electrodes of the fuel cell are not consumed. Instead, they provide the electron transfer site to which a continuous stream of reactants are fed from outside the cell. The specific reactants supplied to a fuel cell must be (1) oxygen or air and (2) either a conventional fuel or a material easily derived from a conventional fuel.

The process of electrolysis, in which electrical energy is consumed to separate water into its component elements of hydrogen and oxygen, has been known for many years. As long as 1842, an English chemist, W. R. Grove, described an experiment in which the process was reversed to release electrical energy by combining oxygen and hydrogen. A few years later, in 1889, Mond and Langer described a continuous feed hydrogen-oxygen battery remarkably similar to many of the approaches being followed today to produce an efficient fuel cell.

Subsequently, many workers have attempted to use the principles of the fuel cell to obtain electrical energy from coal and hydrocarbons since these fuels are more readily available than pure hydrogen and oxygen gases. Except for the efforts of F. T. Bacon in England, who successfully engineered a hydrogen-oxygen cell to the stage of demonstrating a five kw. system, no real progress was made until about six years ago. At that time, the fuel cell once more caught the attention of many academic and industrial concerns. With the availability of more modern technologies, significant progress has been made. This progress is exemplified by the fact that the electrical power requirements of the manned Apollo space craft, which is intended to reach the moon, will be supplied by a fuel cell, rather than by conventional batteries or generators.

The greatest single advantage of the fuel cell is high efficiency. The fuel cell operates isothermally and obtains electrical energy directly from the ordered and oriented movement of ions and electrons which occur during reaction. Other advantages of the fuel cell are silent operation, clean exhaust, ease of maintenance and desirable power characteristic. Another advantage of the fuel cell is that its efficiency is independent of its size because several fuel cells may be joined in modular construction to form a fuel cell pack which produces substantially greater power but at the same efficiency as the small individual cells.

Our scabbard-type fuel cell is well adapted for use with the hydrox-type fuel cell described in good particularity in U.S. Patent No. 2,716,670. The oxidizer to be used in our fuel cell is preferably oxygen gas ($O_2$) operating at 60 p.s.i. and 250° C., the fuel is preferably hydrogen gas ($H_2$) operating at 60 p.s.i. and 250° C., and the electrolyte is preferably potassium hydroxide (KOH) operating at 53 p.s.i. and at a temperature of 250° C. Preferably the electrodes are made of nickel and are of dual porosity, that is they are composed of two different pore sizes in separate layers, to present different pore sizes to the reactants that are presented to the electrolyte. The reactant gas pressure is adjusted so that the liquid is expelled from the coarse pores but not from the fine pores, thus establishing the gas-liquid interface within the porous electrode. The electrode structure is optimized to give the largest possible three-phase reaction zone.

In operation, at the cathode, oxygen gas reactants with the water from the electrolyte and electrons from the electrode to form hydroxyl ions. These ions travel through the electrolyte to an anode. At the anode they react with hydrogen gas producing water and electrons. Half the water goes into the electrolyte to replace that used up at the cathode. The other half of the water, the product of th overall reaction, is evaporated at the anode. The electrons produced at the anode flow around the external circuit producing electrical energy and return to the cathode. A continuous reaction is thus sustained which does not deplete the electrolyte.

In practice, water due to the chemical reactions just described accumulates in the fuel electrode chamber and must be removed therefrom to maintain the electrolyte concentration at the proper value for optimum performance and to limit the electrolyte volume changes that must be accommodated by the bellows. If this water were not removed, it would cause the electrolyte concentration to dilute and will eventually flood the water producing electrode, thereby eliminating the interface and cause a gradual power decay.

While the hydrox fuel cell, just described, has the advantages previously enumerated, it has certain disadvantages in its present form in that the best known electrolyte, potassium hydroxide, is highly corrosive and hence substantial problems are involved in sealing and electrically insulating the various fuel cell parts when introducing reactants and electrolyte into and removing such materials from the hermetically sealed fuel cell container. In the past, fuel cells have been made in plate or pancake form with the electrolyte positioned between oxidizer and fuel electrodes and with the fuel and oxidizer chamber positioned on opposite sides of and outwardly of the electrodes. In this construction, one oxidizer, electrolyte, and fuel chamber each are provided and, in view of the fact that the centrally located electrolyte chamber extends around the full periphery of the fuel cell unit, sealing is required around the full fuel cell periphery. In our scabbard-type fuel cell, which will now be described in greater particularity, a single centrally located reactant chamber, preferably the oxidizer chamber, is positioned between two oxidizer electrodes and two electrolyte chambers are positioned outwardly of the oxidizer electrodes with two fuel electrodes and two fuel chambers positioned outwardly thereof. In this fashion, a single oxidizer chamber is reacting with electrolyte through two electrodes, which electrolyte is in turn reacting with fuel through two additional electrodes.

In our scabbard-type fuel cell, the aforementioned electrodes and the mechanism defining the aforementioned chambers project from a fuel cell cover such that the electrode cover unit may be received in a hollow, open-ended sheath with the cover member filling the sheath's open end and being hermetically joined thereto.

Referring to FIG. 1, we see scabbard or folded type fuel cell 10 which consists basically of two main pieces, namely, hollow sheath and electrode assembly 12, which includes sheath 11 and the fuel electrodes and chambers to be described hereinafter, and cover-electrode mechanism 14 which carries the remaining electrodes and reactant chamber defining mechanism as an integral part thereof. The electrolyte chamber is formed between sheath assembly 12 and cover assembly 14. While sheath-electrode assembly 12 could be of any shape and made of any number of pieces, it is preferably of substantially rectangular shape, reminiscent of a tobacco can, open at one side 16. Cover-electrode mechanism 14 including the electrode assembly unit 47 to be described hereinafter, is inserted in sword-into-scabbard fashion into sheath-electrode assembly 12 so as to position the oxodizer electrodes within the electrolyte cavity 36 while cover member 20, which supports electrode assembly 47 and includes provisions for reactant electrolyte passage therethrough and electrical take-off therefrom, fills open end 16 of sheath 11 and is welded thereto by a continuous weld as at 22 so as to cooperate with sheath 11 in defining and establishing a hermetically sealed chamber for fuel cell operation.

The electricodes are best shown in FIG. 2 and include oxidizer electrodes 24 and 26 positioned symmetrically about axis 28 to define oxidizer chamber 30 therebetween. Electrodes 24 and 26 are sealably joined about their periphery so that chamber 30 is sealed. Flow separators 29 (see FIG. 1) in chamber 30 support electrodes 24 and 26 against the differential pressure and cause uniform oxidizer flow. Fuel electrodes 32 and 34 are positioned outwardly of oxidizer electrodes 24 and 26 to define electrolyte chamber or chambers 36 and 38 therebetween.

Both the oxidizer electrodes 24 and 26 and the fuel electrodes 32 and 34 are of the dual porosity or bi-porous type more fully described in British Patent No. 34,127/58 and U.S. application Ser. No. 847,253, now abandoned, so as to define an interface in each electrode for the electrolyte which enters through the electrode walls of a given porosity to chemically interact with either the fuel or oxidizer which enters through electrode walls of a different porosity. A selected pressure difference is established between the electrolyte and the fuel and oxidizer to cause the interaction interface to be established at the desired point within the dual porosity electrolyte. The electrodes are preferably made of nickel or a nickel alloy.

Back-up plate mechanism 40 includes plates 42 and 44 positioned outwardly of fuel electrodes 32 and 34 so as to form a fuel chamber 33 and 35 with each. Back-up plate mechanism 40 has expandable bellows mechanism 46 attached to three sides of the periphery thereof and includes hairpin spring member 48 defining chamber 50 therewithin. The purpose of the bellows mechanism 46–48 is to seal electrolyte chamber 36 and 38 and to absorb differential thermal concentration expansion established during fuel cell operation. Cavity 50 may be used to receive an electrolyte temperature control or may be used as an instrument cavity. The electrolyte temperature control could also be placed as shown at 52 at selected positions along the outboard or inboard side of sheath 12. Either temperature control could be heated or cooled by a separate electrical or other temperature varying source (not shown) or by the operating cell and would perform the function of causing the electrolyte to change from solid to liquid state initially, in the vicinity of the flexible bellows during start up and then throughout the system and return to the solid state last during cool down to insure that the flexible bellows 46 is available to absorb the relative thermal expansion encountered between parts during both processes. The electrolyte temperature control also controls electrolyte temperature during all other operating conditions. Back-up plate mechanism 40 cooperates with sheath 12 to define inert gas chamber 60 therebetween. A modified form of bellows 46 is shown in FIG. 5.

Preferably, back-up mechanism 40 and fuel electrodes 24 and 26 are sealably joined together through fuel conduit system 79 (see FIGS. 4 and 6) to form fuel chambers 33 and 35 and sheath 11 is then sealably joined thereto to form inert gas chamber 60 therebetween and to form sheath-electrode assembly 12. The cover-electrode mechanism 14, which includes oxidizer electrodes 24 and 26 forming oxidizer chamber 30 and oxidizer conduit system 220 passing through cover 20, is then inserted in sword-in-scabbard fashion into sheath-electrode assembly 12 and sealably joined thereto by a continuous weld at 22.

Oxidizer, preferably oxygen ($O_2$), enters the fuel cell mechanism 10 through conduit 62 (see FIGS. 1 and 3) and may be withdrawn from fuel cell 10 through conduit 64 or vice versa, each of which sealably pass through cover 20 so that oxidizer cavity 30 remains sealed. The oxygen is thus caused to fill oxidizer cavity 30, after cover-electrode mechanism 14 has been welded to sheath 12. Oxygen is caused to flow through cavity 30 only for purposes for start-up purge and for purposes of replenishing a contaminated oxygen supply. Continuous oxygen flow is expected not to be necessary and hence once the chamber 30 is filled, oxygen will not be drawn off. To provide the necessary electrolyte-reactant pressure differential, to be discussed further hereinafter, the oxygen is provided into chamber 30 by appropriate pressurizing means (not shown) so as to establish oxygen in chamber 30 at the pressure of 60 p.s.i.

The electrolyte, some corrosive salt such as potassium hydroxide (KOH), is passed into electrolyte chamber or chambers 36 and 38 through electrolyte fill duct 70 and is vented therefrom through vent 72 until chambers 36 and 38 are fully purged and filled, at which time the fill and vent tubes 70 and 72 are sealed off so that the electrolyte is entrapped in the completely filled electrolyte chamber or chambers 36 and 38. Tubes 70 and 72 sealably pass through cover 20 so that chambers 36-38 remain sealed. Fuel, such as hydrogen ($H_2$), enters the fuel cell through conduit 80 and then enters manifold 82 which includes conduits 84 and 86 which extend along one side of the fuel chambers 33 and 35 and are welded to both the fuel electrodes 32 and 34 and the back-up plate mechanism 40 and include a plurality of apertures such as 88 and 90, preferably extending along the entire side dimension of the fuel chambers 33 and 35 so as to place the interiors of tubes 84 and 86 into communication with the fuel cavities 33 and 35. Exhaust lines, including tubes 94 and 96 extend, respectively, from tubes 84 and 86 and include perforations 98 and 100 which place the interiors of conduits 94 and 96, which are welded to fuel electrodes 32 and 34 and to back-up plate mechanism 40, into communication with the interior of the fuel cavities 33 and 35. The fuel which enters conduit 80 passes into manifold 82 and then through ducts 84 and 86 and through apertures 88 and 90, then through fuel cavities 33 and 35 and then through apertures 98 and 100 into exhaust lines 94 and 96 and eventually out the fuel discharge line 104. Conduits 80 and 104 sealably pass through cover 20. A preferred embodiment of the fuel conduit construction is shown in greater particularity and in isolated form in FIG. 6 and will be described in greater particularity hereinafter. It will be noted, however, that due to this fuel manifolding construction, fuel of the same purity is passed uniformly through the fuel cavities 33 and 35 and serve to pick up water which collects in the fuel chambers as a result of the chemical reactions taking place between the electrolyte and the fuel in fuel electrodes 32 and 34 and discharge such water out of the fuel cell through conduit 104. This water vapor may then be condensed for uses such as drinking water on space missions.

An inert gas, such as nitrogen ($N_2$), is passed through tube 106, as shown in FIG. 3, and fills cavity 60 between sheath 11 and back-up mechanism 40. Both the fuel and the oxidizer have been introduced to their respective chambers at a pressure of 60 p.s.i. The nitrogen is introduced into chamber 60 at a pressure of 53 p.s.i. Due to the compressive action of bellows 46–48, the electrolyte within chambers 36 and 38 is pressurized at this 53 p.s.i., thereby establishing a 7 p.s.i. pressure differential between the electrolyte and both the fuel and the oxdizer. This pressure differential combines with the dual porosity feature of the electrodes to establish the chemical interaction interface at the desired position within the fuel and oxidizer electrodes to establish chemical reaction to produce electrical energy.

The electrical energy generated by the chemical fuel cell action is taken off at take-offs from opposite polarity terminals such as 110 on cover 20 and 112 on conduits 62 and 64.

It will be obvious that scabbard type fuel cells such as 10 may be nested together in any convenient number and have their electrical take-offs combined in known fashion so as to produce electrical power of any desired intensity. Nested or module scabbard fuel cells, of any number, could be placed with covers 20 in proximity so that common reactant, electrolyte and inert gas lines may be used.

Element 120 projects from oxidizer electrodes 24 and 26 and serves to electrically insulate them from the bellows element 46–48 of the back-up plate mechanism 40 which is connected to the fuel electrodes and also serves as a damper mechanism to prevent the electrolyte from pumping back and forth between electrolyte chambers 36 and 38.

Preferably, sheath 11 is made of nickel, back-up plates and bellows are made of nickel, and cover 20 is made of nickel.

As best shown in FIG. 4, our scabbard type fuel cell 10 could be made with both sheath 11 and hence inner gas chamber 60 omitted. In this configuration, back-up member unit 40 forms the outer covering and supports the fuel electrodes and is hermetically sealed to cover member 14 at 22. The oxidizer-electrode mechanism 477 is carried by cover member 14 and received in scabbard fashion into the sheath-electrode mechanism 12. In this construction, it will be noted that the electrolyte is not pressurized by the inner gas chamber.

It will be obvious to those skilled in the art that the oxidizer and fuel chambers and electrodes could have been used interchanged from that shown in FIGS. 1–4; namely, with the fuel being centrally located in chamber 30 and the oxidizer on opposite sides externally thereof in chambers 33 and 35.

While in applicants' preferred embodiment shown in FIG. 1 the oxidizer electrodes only are part of the cover-electrode unit 14 and the fuel electrodes and back-up plate member 40 are part of sheath-electrode unit 12. It will be obvious to those skilled in the art that cover-electrode unit 14 could include both the oxidizer and fuel electrodes as well as the back-up plate member 40. In such a construction, all of the electrodes, reactant chambers and electrolyte chambers would be attached to cover 20 and be inserted in sword fashion therewith into sheath 11.

Referring to FIG. 6 we see a preferred embodiment of the fuel cell reactant supply means 79 in greater particularity. While it will be described in connection with the providing of fuel to the scabbard-type fuel cell, it should be borne in mind that it is equally applicable in use to providing the oxidizer or fuel to any type fuel cell. FIG. 6 shows the conduit mechanisms 79 involved in form separated from the remainder of the fuel cell 10 but fragmentary showings of the fuel chambers defining wall members, to which the reactant supplying conduits are attached, are shown in broken away fashion, for purpose of complete illustration.

Fuel passes through cover plate member 20 in conduit 80. Conduit 80 splits into two parallel lines 84 and 86 which pass across the top of the fuel chambers 33 and 35. Parallel flow lines 84 and 86 eventually terminate at ends 85 and 87 adjacent outlet conduit 104 which sealably passes through fuel cell cover member 20. It will be noted that the fuel flow into and out of fuel supply mechanism 79 is from the same side, and preferably the cover side, of the fuel cell device. Apertures, preferably in the form of equally spaced holes 88 and 90, are positioned in parallel conduits 84 and 86 extend the full length of the fuel chambers 33 and 35 and place the interior of these fuel chambers into communication with the interior of ducts 84 and 86. Exhaust lines 94 and 96 originate at ends 93 and 95 near parallel lines 84 and 86, respectively, and pass down one wall or side of the rectangular fuel chambers 33 and 35 and then across the bottom thereof and then up the opposite side thereof to join outlet conduit 104 which sealably passes out through cover 20. The legs 97 and 99 of exhaust lines 96 and 94, which are opposite to the parallel conduit lines 84 and 86 include apertures 98 and 100, which are preferably equally spaced circular holes extending along the full dimension thereof so as to extend along the full side or bottom of the fuel chambers 33 and 35.

Conduits 84 and 86 together with conduits 94 and 96 are preferably welded to the fuel electrodes 32 and 34 and back-up plate member 40 and sections 42 and 44 so as to cooperate therewith in defining fuel chambers 33 and 35.

As best shown in FIG. 6, the reactant enters conduit 80 and then passes along the full length of parallel conduits 84 and 86 and is discharged therefrom as shown by the arrows, through apertures 88 and 90, respectively, and then flows through the fuel chambers 33 and 35 and apertures 98 and 100 into exhaust conduits 94 and 96, respectively, and then jointly into scavenge or exhaust outlet conduit 104.

Another possible construction would be to position conduits 84 and 86 and 94 and 96 outwardly of the back-up plate member 40 and provide apertures in the back-up plate member corresponding to apertures 98 and 100 and 88 and 90 of the above-mentioned conduits for purposes of admittance of fuel into the fuel chambers.

It will also be evident that if this reactant supply system were to be used with a fuel cell which was not of the scabbard-type, provisions could be made therefor by merely eliminating one or the other of the parallel conduits 84 or 86 and the corresponding exhaust lines 94 and 96 therefrom.

The advantage of this particular reactant supply system 79 is that the reactant is admitted and discharged from one side of the fuel cell only and pure reactant is provided uniformly throughout the entire fuel chamber volume to pick up and remove the water which has been deposited therein due to the chemical reaction in the electrode. In other known constructions, the fuel is passed through the fuel chamber in serpentine or other type fashion wherein the fuel is contaminated in the early portion of its flow and contaminated fuel only reaches certain sections or the fuel chambers.

It might be advisable to provide stagnation abatement holes 101 and 103 in conduits 94 and 96 for the purpose of completely purging the conduits.

A second fuel supply embodiment 79' is shown in FIG. 7 and operates in somewhat similar fashion to the embodiment shown in FIG. 6 but provides reverse flow through the respective fuel chambers 33' and 35' as indicated by arrows therein and has the advantage of being fabricated from two precisely similar parts, namely elements 81 and 83. Element 81 includes inlet conduit 80', conduit 84' and exhaust conduit 96'. Element 83 includes scavenger exhaust conduit 104', conduit 86', and exhaust conduit 94'. Wherever possible similar reference numerals are used with a prime in FIG. 7 to correspond to these used in FIG. 6.

It will be obvious from the showing of the FIG. 7 construction and the arrows included therewith that reactant flows into inlet conduit 80' and then splits into conduit 82'. A portion of the reactant in conduit 82' goes into conduit 84' and from there through apertures 88' and downwardly through the reactant chamber 33' and thence through apertures 98' into exhaust line 94' and out exhaust conduit 104'. The remainder of the reactant which entered inlet conduit 80' and splits into conduit 82' flows through line 96' thence through apertures 100' then upwardly through reactant chamber 35', then through apertures 90', then through conduit 86' for discharge through discharge conduit 104'.

From this description of the FIG. 6 construction, it will be obvious that the reactant flows in opposite directions in the two reactant chambers 33' and 35' and that the two parts which form the reactant conduit system 79' are identical and are members 81 and 83.

Referring to FIG. 8 we see a cross-sectional and enlarged showing of the wall of a corrosive fluid container such as cover member 20 of scabbard fuel cell 10. Container cover 20 has passage 200 extending therethrough and defined by container cover walls 202, 204, 205, 206, 208 and 210, each of which is either radially extending or of circular cross section and concentric about passage axis 212.

It will be noted that sections 202, 205 and 210 are cylindrical in shape about axis 212 whereas sections 204 and 206 are radially extending with respect to axis 212 and that section 208 is tapered or conical with respect to axis 212.

Tube member 220 extends concentrically through passage 200 and includes tie bolt 222, bolt head 224, both of which have centrally located and axially aligned bores 226 and 228 through which the fluid or gas such as the oxidizer or fuel will pass. Tie bolt 222 and head 224 are threadably connected as shown by cooperating threads 225. Tube mechanism 220 further includes sleeve member 230, which is either an integral part of or brazed or welded to tie bolt head 224 forming a sleeve over tie bolt 222. With sleeve 230 and bolt head 224 so joined, neither the material of plastic seal 300 nor the corrosive salt from passage 200 may pass therethrough. Tube member 220 further includes thrust bushing 232 and spring cover 234 which cooperate to define adjustable spring chamber 236 therebetween. Coil spring 238 extends concentrically around axis 212 and between surfaces 240 and 242 of thrust bushing 232 and spring cover 234, respectively. Nut 250, which threadably engages tie bolt 222 along threaded section 252 thereof, is used to adjust the tension of spring 238 within spring cavity 236. By calibration, the amount of force which is imposed upon spring 238 can be determined by the size of gap 260 which exists between surface 240 of thrust bushing 232 and surface 262 of spring cover 234.

Figure 9:
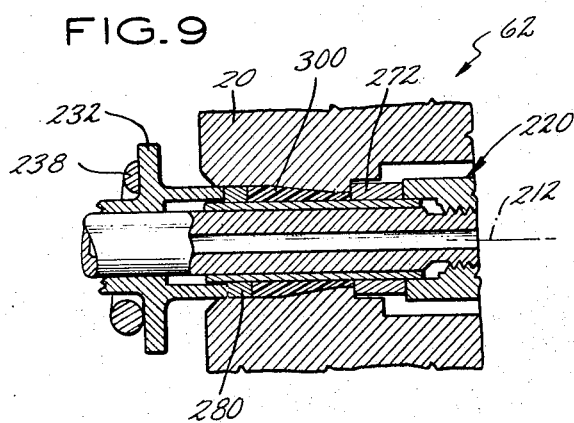
FIG. 9 is a modified version of the seal shown in FIG. 8.

Bolt head 224 is provided with radially extending shoulder 264, which shoulder cooperates with radially extending shoulder 206 of cover 20, passage wall, sleeve 230 and surface 205 to define a substantially annular space of rectangular cross section 270, which is snugly filled by insulator ring 272. It will further be noted that container passage walls 210, 208, 206, 205, 204 and 202 form an annular passage with tube member 220, and particularly with sleeve 230 thereof. Insulator ring 280 extends snugly between the outer surface 282 of sleeve 230 and the inner surface 210 of the walls of passage 200. Insulator ring 280 is in contact with thrust bushing 232 which, due to the urging of spring 238, urges insulator ring 280 rightwardly as shown in FIG. 8. It will further be noted that insulator rings 272 and 280 cooperate with cylindrical surface 282 of tube member 220 and the passage wall section 208 of cover 200 to define an annular cavity 290 therebetween. This annular cavity may be conical or tapered or rectangular so as to be of minimum radial dimension adjacent the insulator ring 272. Teflon seal 300 is placed within cavity 290 and serves either to completely fill said cavity as best shown in FIG. 9, or to fill said cavity with the assistance of rubber O ring 302.

With the seal and insulator mechanism so assembled, it will be noted that the action of spring 238 tends to urge thrust plate 232 rightwardly and hence against insulator ring 280 to urge said insulator ring rightwardly and to also urge spring cover 234 leftwardly. Said spring cover 234 abuts nut 250, which threadably engages tie bolt 222, the action of spring 238 is to urge the tie bolt 222 and bolt head 224 leftwardly. This leftward force on tie bolt 222 causes cooperating shoulders 264 and 206 of container cover 20 and tube unit 220, respectively, to bear snugly against the radially extending surfaces 304 and 306 of insulator ring 272. This leftward urging of insulator ring 272 and the rightward urging of insulator ring 280 will serve to compress plastic seal ring 300, which may be made of Teflon or asbestos and buna S rubber, or other similar corrosive resistant plastics, tightly within annular cavity 290, thereby causing the plastic seal ring 300 to completely fill cavity 290. While these plastic materials, such as Teflon, not completely impervious to the corrosive attack of the corrosive salt fluids which pass at times into passage 200 of container cover 20 and which will attempt to seep past the insulator ring 272 and the plastic seal ring 300 ,nevertheless, by causing the shoulder-to-seal action just described, the amount of corrosive salt leakage therepast and into contact with the plastic seal ring 300 will be minimum. In addition, the compressive force so imposed upon the seal 300 will cause it to expand as much as possible within annular chamber 290 and thereby fill the void lost to corrosive action when the slight deterioration to which it is subjected does take place. Preferably, annular chamber 290 is wedge shaped so as to present minimum Teflon to the insulator ring 272 and thereby additionally cut down the amount of corrosive action on seal 300.

It will be obvious to those skilled in the art that since the insulator rings 272 and 280 are received snugly between cylindrical surfaces 282 on their inner sides and cylindrical surfaces 205 and 210, respectively, on their outer sides, that these insulator rings will serve to concentrically position tube unit 220 and plastic seal ring 300 about axis 212.

While plastic seal material, such as Teflon, has the quality of leaking or flowing past any small opening offered to it when in compression, it will be noted that in this construction, since the insulator ring 280 bears snugly against the aforementioned cylindrical surfaces 282 and 210 and insulator ring 272 bears against radial surfaces 206 and 264, no such seepage possibility is provided because the plastic seal material is completely confined within annular cavity or chamber 290.

Electric insulator ring 272 is preferably made of a ceramic compatible with the corrosive salt used as an electrolyte, possibly thoria and insulator ring 280 is preferably made of an incompressible insulating material, such as $Al_2O_3$, not essentially compatible with the corrosive salt.

Elastomer O ring 302 serves the function of providing followup action to the plastic seal, and in some instances may even be sufficient, if used without spring 238, provided that proper anchorage means is provided for electric insulator ring 280. This followup action is brought about as the O ring 302 is brought into complete compression so as to assume a square cross-sectional shape, as tube 220 is assembled within passage 200 of container cover 20.

While as described herein, passage 200 and tube member 220 are described to be of circular cross section, it will be obvious to those skilled in the art that other cross sectional shapes could have been chosen.

It is to be understood that the invention is not limited to the specific embodiment herein illustrated and described but may be used in other ways without departure from its spirit as defined by the following claim.

We claim:

A container for corrosive salts having a passage through the wall thereof, which passage is defined by passage walls of circular cross section and concentric about an axis and includes a substantially radially extending shoulder, a tube of circular cross section and concentric about an axis extending through said passage to form an annular chamber with said passage walls and including a radial shoulder cooperating with said passage wall radial shoulder to define an annular space therebetween at one end of said annular chamber, a first solid electric insulator ring snugly fitting in said annular space and snugly engaging said tube and extending between said shoulders, a second solid dielectric insulator ring positioned at the opposite end of said annular chamber from said first ring and snugly engaging said tube and said passage wall and cooperating with said tube, passage walls and first ring to define an annular cavity, a solid plastic seal ring extending between said insulator rings and completely filling said annular cavity, means to urge said shoulders toward one another so that said first insulator ring is in tight engagement therewith and wherein said second electric insulator ring is closer to the exterior of the container than said first electric insulator ring and wherein said passage wall shoulder is closer to the exterior of the container than said tube shoulder, and wherein said shoulder urging means includes a thrust bushing enveloping said tube and bearing against said second insulator ring and a spring cover mechanism cooperating with said thrust bushing to define a spring chamber and engaging said tube, and a spring positioned in said spring chamber to urge said spring cover mechanism and said thrust bushing apart, thereby urging said shoulders together and urging said second insulator ring towards said first insulator ring.

References Cited

UNITED STATES PATENTS

| | | | |
|---|---|---|---|
| 2,275,281 | 3/1942 | Berl | 136—86 |
| 3,075,911 | 1/1963 | Anderson | 220—24.5 X |

ALLEN B. CURTIS, *Primary Examiner.*

WINSTON A. DOUGLAS, *Examiner.*

UNITED STATES PATENT OFFICE

CERTIFICATE OF CORRECTION

Patent No. 3,343,989 September 26, 1967

Augustus Hasbrouck et al.

It is hereby certified that error appears in the above numbered patent requiring correction and that the said Letters Patent should read as corrected below.

Column 10, line 33, for "dielectric" read -- electric --.

Signed and sealed this 8th day of October 1968.

(SEAL)
Attest:

Edward M. Fletcher, Jr.
Attesting Officer

EDWARD J. BRENNER
Commissioner of Patents